United States Patent [19]

Lu et al.

[11] Patent Number: 4,969,378
[45] Date of Patent: Nov. 13, 1990

[54] CASE HARDENED ROLLER CUTTER FOR A ROTARY DRILL BIT AND METHOD OF MAKING

[75] Inventors: Mou-Chih Lu, Houston; Eric F. Drake, Pearland, both of Tex.

[73] Assignee: Reed Tool Company, Houston, Tex.

[21] Appl. No.: 420,872

[22] Filed: Oct. 13, 1989

[51] Int. Cl.$^5$ .............................................. B21K 5/02
[52] U.S. Cl. ........................... 76/108.2; 76/DIG. 12; 76/DIG. 2; 148/16.6
[58] Field of Search ................. 76/108.1, 108.2, 108.4, 76/DIG. 12, DIG. 2, 101 E; 148/16.6, 20.3

[56] References Cited

U.S. PATENT DOCUMENTS

| | | |
|---|---|---|
| 4,011,111 | 3/1977 | Hook . |
| 4,054,426 | 10/1977 | White . |
| 4,212,687 | 7/1980 | Tanaka et al. . |
| 4,303,137 | 12/1981 | Fischer . |
| 4,309,227 | 1/1982 | Kajikawa et al. . |
| 4,640,169 | 2/1987 | Fromson et al. . |
| 4,704,168 | 11/1987 | Salik et al. . |

OTHER PUBLICATIONS

"Industrial Heating" magazine, Jul. 1987 issue article entitled Basic Principles and Applications of Ion/-Plasma Nitriding with Focus on AISI 4140 by Larry Jones.

"Heat Treating" magazine, Mar. 1987 issue article entitled Guidelines for Choosing The Ion Nitriding Process by James G. Conybear.

"Heat Treating" magazine, Jan. 1986 issue pp. 26-29, article entitled Technological, Industrial Trends and New Applications by M. H. Jacobs.

"Heat Treating" magazine Jan. 1986 issues, pp. 22-24 article entitled Eight Ion Treaters.

"Heat Treating" magazine, Jan. 1986 issue, pp. 30-31, article entitled Transistor-Based Power Supply Boosts Ion Nitriding's Viability by David Edwards.

"Metal Progress" magazine, Jul. 1963 issue, pp. 78-80 article entitled Working with Maraging Steels by John B. Seabrook.

"Heat Treating" magazine, Aug. 1985 issue, pp. 22-25 article entitled Holding Steady With Salt, Growing With Ion Nitriding by Richard Creal.

"Metal Progress" magazine, Mar. 1976, pp. 181-190 article entitled Production Ionitriding by Bernd Edenhofer.

Article entitled "An Introduction to Ion Nitriding, What is it? Why is it Used? Where is it Used?" (undated) by William Kovacs, William Russell.

*Primary Examiner*—Roscoe V. Parker
*Attorney, Agent, or Firm*—Dodge Bush & Moseley

[57] ABSTRACT

A roller cutter (28) for a rotary drill bit (10) and method of making, utilizing an ion nitriding hardening process for the external surface (42) and the internal bearing surfaces (33, 34, 38) in the central cavity (30) of the roller cutter (28). The roller cutter (28) is made from a through hardenable steel and the ion nitrided hardened layer (77) has a total thickness less than around 0.030 inch. Hardened layer (77) has a relatively thick inner stratum (80) and a relatively thin outer surface stratum (78). The outer stratum (78) is formed of $Fe_4N$ having a thickness no greater than around 0.0004 inch to form an outer surface which is ductile and has a relatively low friction coefficient.

9 Claims, 3 Drawing Sheets

CASE HARDENED ROLLER CUTTER FOR A ROTARY DRILL BIT AND METHOD OF MAKING

BACKGROUND OF THE INVENTION

This invention relates to a case hardened roller cutter for a rotary drill bit and method of making, and more particularly to case hardened surfaces of a tungsten carbide insert type roller cutter and method of making same from a high hardenability steel.

Heretofore, roller cutters for rotary drill bits have been primarily of forged low carbon steels, i.e., steels having a carbon content between 0.10 and 0.20 per cent carbon, and such low carbon steel have commonly been case hardened by carburizing, quenching, and tempering processes. As well known, carburizing increases the carbon content of the surface of a steel and provides case hardening. Case hardening obtains a hard, wear resistant surface with a tough interior and low carbon steels have been commonly used heretofore for roller cutters. However, stringent hardenability requirements for low carbon carburizing grade steels are necessary to achieve a suitable strength/toughness balance in the core properties of insert type roller cutters. Failure to achieve the optimum level disposes the cutter toward either insert loss or cutter cracking. A variety of carburizing steel grades have been used to fabricate insert-type roller cutters, including PS-55, AISI 9310, 9315, 4815, and 4820.

A suitable steel is selected so that after carburizing of the bearing surfaces, and upon quenching and tempering the roller cutter for obtaining a case hardness of around RC60, the core yield strength of the roller cutter will be at least around 150 KSI. The chemistry of the steel is critical in obtaining the desired yield strength while maintaining suitable toughness. After heat treating, insert holes or sockets are drilled in the exterior of the cutter body for insertion of tungsten carbide inserts. Finally, the bearing races are finish ground to specified size and finish. The rolling cutter bearing race formed as above has a case hardened surface which is suited for use as a race for rolling bearings but which is often not sufficient when used as a sliding or friction bearing surface, particularly as the main friction bearing surface of a rock bit, without adding some feature to reduce the friction. If such a case hardened main friction bearing surface on the roller cutter is run directly against a typical journal which is formed of case hardened steel or steel with a welded on layer of stellite, experience has shown that the frictional heat generated is too high for such a bearing surface to function satisfactorily in a roller cutter drill bit under conditions normally encountered during operation.

Different methods or materials have been utilized heretofore for such main friction bearing surfaces of roller cutters for reducing the friction in such bearing surfaces to acceptable levels. Such methods have included, for example, the addition of floating bushings having an anti-galling metal thereon, the boronizing of the outer bearing surface after the carburizing, and the use of an alternating inlay of anti-galling metal with the carburized case hardened bore of the roller cutter.

Also, bearing surfaces for roller cutters or cones have been case hardened heretofore by high energy sources. For example, in U.S. Pat. No. 4,303,137 a method is disclosed for making a tungsten carbide insert rolling cutter using medium to high carbon steels for improved hardenability and hardness control. The method described in U.S. Pat. No. 4,303,137 selectively case hardens the ball race surface by using a high energy source such as induction heating, electron beam or laser beam to rapidly heat the surface for austenizing a surface layer which is rapidly cooled for case hardening the surface. Such a case hardened surface is similar in physical structure and chemistry to that obtained by carburizing a low carbon steel and is suitable for a rolling element bearing surface, but if used on the main friction bearing surface of the rolling cutter excessive friction is generated unless some other feature is added to reduce friction such as indicated above. Additionally, the method set forth in U.S. Pat. No. 4,303,137 for hardening the ball race of a medium to high carbon steel entails a number of fixturing and control problems which significantly affect process economics in a production environment.

Ion nitriding generally has been used heretofore for the surface hardening of metal for various applications such as for use in gears, valves, gun barrel interiors, and on crankshafts for internal combustion engines. However, bearing surface applications historically have been limited to hydrodynamic or hydrostatic design and/or relatively light loading as compared to the relatively high loading on the main friction bearing races of drill bits.

SUMMARY OF THE INVENTION

The present invention is directed to an improved case hardened surface of a tungsten carbide insert type roller cutter and method of forming same including the external surface and the internal friction bearing surface. An improved internal bearing cavity of the roller cutter results from ion-nitrided surfaces which provide reduced friction and will run as a boundary-lubricated friction bearing surface against carburized journal surfaces on the associated rotary drill bit without the addition of any alternate means to reduce friction. The lubrication regime for the mating friction or sliding bearing surfaces of a roller cutter for a drill bit is boundary lubrication which does not generate a lubricant film thickness sufficient to prevent significant contact between asperities of the mating bearing surfaces. In a hydrostatic or hydrodynamic lubrication regime, a significant lubricant film thickness is provided to prevent any sufficient surface contact between mating bearing surfaces. The material for the roller cutter is a medium to high alloy carbon steel (0.35 per cent to 0.75 per cent carbon content) for improved strength and heat-treat process control.

A roller cutter blank is formed from the medium to high carbon steel and includes a generally cylindrical internal bearing cavity and a generally conical external surface. The cutter blank is heat treated to obtain a desired strength of a minimum of around 150,000 psi yield strength, then the insert holes or sockets are drilled in the exterior surface, and next, tungsten carbide cutting inserts are mounted in the sockets. The bearing surfaces are then finish machined to the desired finish dimensions and the desired surface finish.

The cutter blank thus formed is now ready for the application of the ion nitriding process for the case hardening of the external surface and the internal cylindrical friction bearing surface which has been finished to its desired surface finish and desired dimensions without any additional finish being required after ion nitriding.

The basic principle of the ion nitriding process is the glow discharge produced in a vacuum vessel between two electrodes at a high DC voltage of around 500 to 1000 volts with a low pressure nitrogen containing gas (1-10 Torr). In the electric field the gas molecules dissociate and become ionized with positive ions attracted toward the cathode (−) and electrons toward the anode (+). In the ion nitriding process the parts to be nitrided act as the cathode which is electrically isolated from the vacuum vessel which acts as the anode.

To begin the process, the vacuum vessel is evacuated and then filled with a low pressure inert gas such as hydrogen to prepare for the sputtering stage. At this point the DC voltage is switched on and the glow discharge ignited. The positive ions produced in the glow discharge collide with the surface of the parts, sputtering off surface contaminants and transforming kinetic energy to heat energy which heats the parts to the necessary diffusion temperature. Upon completion of the sputtering stage the gas is switched to a nitrogen-hydrogen mixture for the duration of the process.

There are four steps or means by which the nitrogen diffuses into the material. First, the nitrogen atom is ionized, yielding a nitrogen ion and two electrons. The ion collides with the surface of the workpiece, sputtering off atoms such as iron (Fe). An Fe atom which has been sputtered off the surface may combine with a neutral nitrogen atom to form iron nitride (FeN). Finally, the FeN deposits onto the workpiece surface creating a nitrogen diffusion gradient.

The desired case thickness is provided by a precise control of variables including temperature, time, gas mixture, gas pressure, and voltage for the ion nitriding process. Such a controlled process for ion nitriding to form case hardened friction bearing surfaces on a roller cutter for a rotary drill bit has not been utilized heretofore.

As a specific example, a medium carbon low-alloy steel, such as AISI 4140 or 4340, for example, may be utilized for the roller cutter body having a central cavity forming internal friction bearing surfaces for fitting against a journal of the drill bit body. The roller cutter body is heat treated before the application of ion nitriding. Such prior heat treating includes heating to around 1550° F., quenching to oil bath temperature of around 140° F.-180° F., and then tempering at around 950° F. for a period of about two hours, for example. The roller cutter body is then formed with sockets for receiving the cutting inserts prior to the application of the ion nitriding process. After heat treating, forming the sockets, and mounting the inserts, the internal friction bearing surfaces of the roller cutter are machined or ground to finish dimensions and a smooth surface finish of between around ten (10) and fifteen (15) microinches RMS prior to the application of the ion nitriding process. After such finishing the internal friction bearing surfaces are not subjected to any further finishing procedures and the roller cutter body is then in condition for the ion nitriding process.

The ion nitriding process or method includes heating the roller cutter body to a temperature over at least 750° F. and preferably around 900° F. in an enclosed vessel for controlling the atmosphere. A low pressure of 1 to 10 Torr is provided within the vessel and a high DC voltage from between 500 to 1000 volts is applied within an atmosphere of a nitrogen and hydrogen gas mixture at a ratio of 25% nitrogen and 75% hydrogen by volume. The vessel forms the anode and the roller cutter body forms the cathode and nitrogen ions bombard, penetrate, and harden the external surface and the exposed bearing surfaces within the inner core of the roller cutter to form a hardened case layer of a desired thickness for the surfaces while maintaining the smooth finish of between 10 and 15 microinches RMS for the bearing surfaces. The temperature, time, pressure, and voltage are varied to provide the desired case thickness between 0.005 and 0.030 inch at a hardness of at least 50RC. The hardened case layer of the bearing area comprises two separate strata, (1) an inner relatively thick stratum which is a segregation free, diffusion stratum of a thickness greater than around 0.005 inch, and (2) an outer thin white surface stratum consisting of a compound gamma prime phase of $Fe_4N$ of a thickness of between 0.0001 inch and 0.0004 inch. Such a hardened friction bearing surface formed of such strata provides a non-porous, but ductile bearing surface having a low friction coefficient and without any further finishing or grinding being required after application of the ion nitriding process. Alternatively a buffing or microfinishing operation may be added after ion-nitriding to obtain even smoother surface finishes.

It is an object to provide an economical controllable method for case hardening external surfaces and internal cylindrical friction bearing surfaces on a roller cutter while improving the structural strength and toughness of the roller cutter.

It is a further object of the present invention to provide an ion nitriding hardened friction bearing surface for such a roller cutter which is made from a medium carbon to high carbon steel.

Another object of the invention is to provide a case hardened friction bearing surface on a roller cutter for running against a case hardened journal at a minimized friction and without the addition of any other features or steps to reduce friction.

It is a further object of the present invention to utilize such an ion nitriding process for hardening the internal friction bearing surfaces of a roller cutter in which the thickness of the hardened layer for the bearing surfaces is predetermined by a precise control of certain process variables including the temperature, time, gas mixtures of hydrogen and nitrogen, pressure, and voltage for the ion nitriding process.

An additional object of the invention is the utilization of such an ion nitriding process for hardening the internal friction bearing surfaces of a roller cutter in which the hardened layer of the internal bearing surfaces include a relatively thick inner segregation free diffusion stratum, and a relatively thin outer stratum of a gamma prime monophase.

Other objects, features, and advantages of this invention will become more apparent after referring to the following specification and drawings.

DESCRIPTION OF THE INVENTION

Figure 1:
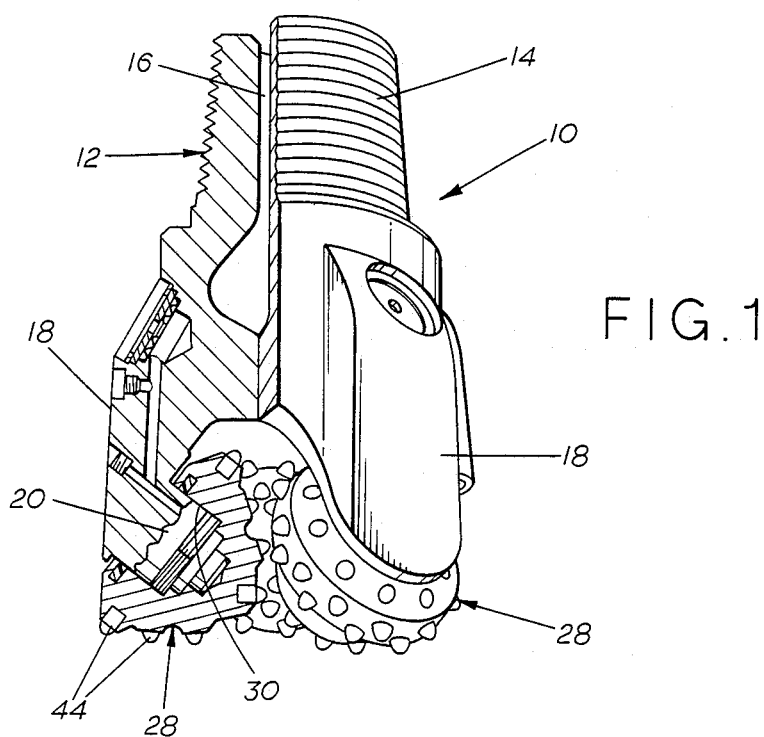
FIG. 1 is an elevational view, partly in section, of a rotary drill bit having three roller cutters or cones mounted for rotation on journals on the bit body.
Figure 2:
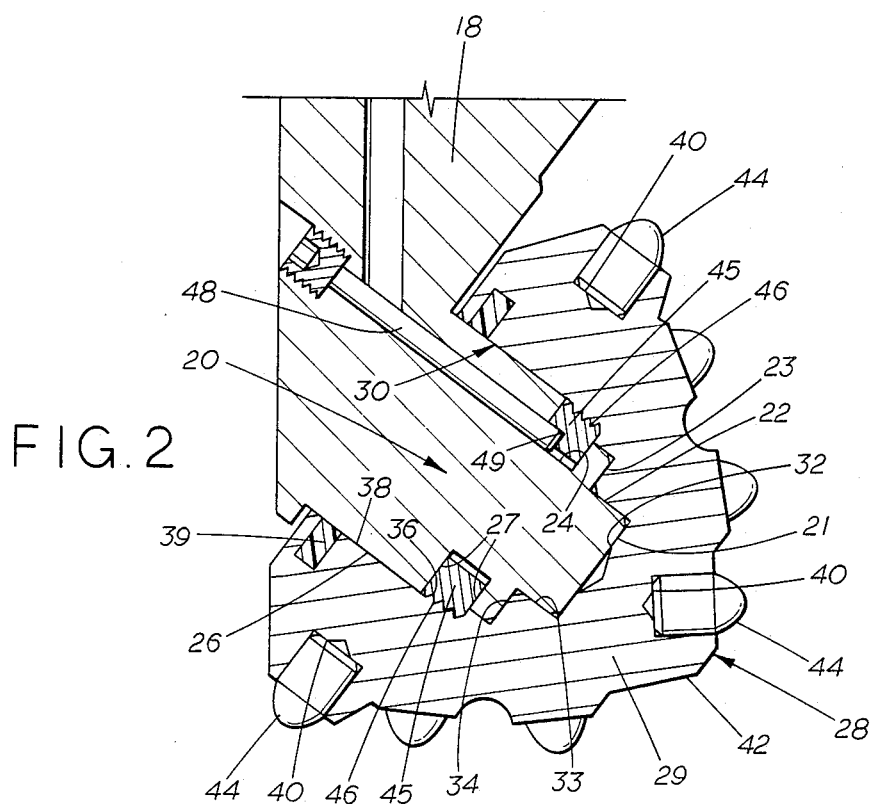
FIG. 2 is an enlarged fragment of FIG. 1 showing a roller cutter mounted on a journal of the bit body for rotation.
Figure 3:
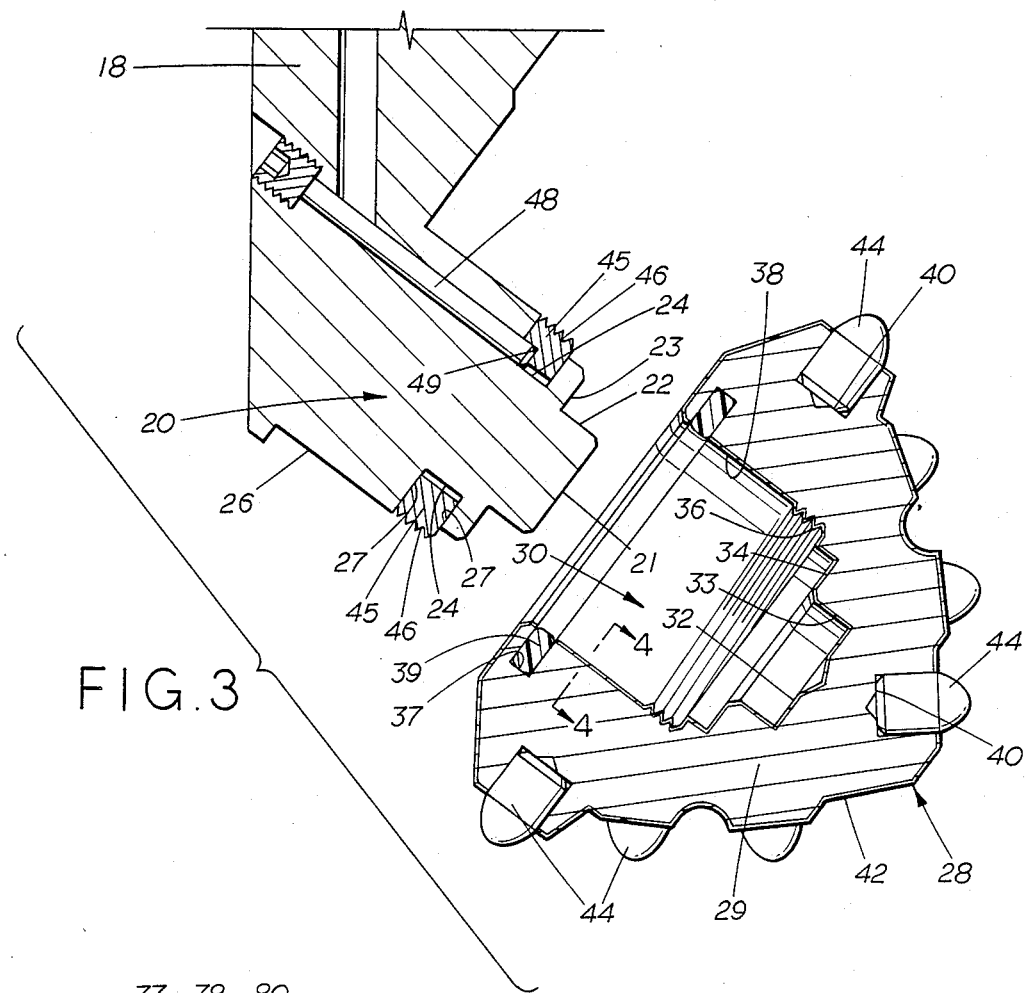
FIG. 3 is an exploded view of FIG. 2 showing the roller cutter removed from the associated journal of the drill bit and particularly illustrating the internal bearing surfaces along the central cavity of the roller cutter.

Referring to the drawings for a better understanding of this invention, and more particularly to FIGS. 1 and 2, a rotary drill bit is shown generally at 10 having a bit body 12. Bit body 12 includes a threaded upper end 14 adapted to be connected to a drill string (not shown) for rotation of drill bit 10 and for the supply of drilling fluid to a drilling fluid chamber 16. Body 12 has three depending legs 18, each having a journal 20 on its lower end. Journal 20 has an end surface 21, a small diameter peripheral friction bearing surface 22, a thrust bearing surface 23, an annular groove 24, and an outer large diameter main friction bearing surface 26. Groove 24 defines opposed shoulders 27. Bearing surfaces 22, 23 and 26 are ground or finished to a surface finish having a roughness preferably around ten (10) microinches RMS and not greater than around thirty (30) microinches RMS.

A roller cutter or cone generally indicated at 28 has a body 29 defining a blind end central bore or cavity generally indicated at 30 defining an end surface 32 normally spaced slightly from end surface 21 on journal 20, a small diameter peripheral friction bearing surface 33, an annular thrust bearing surface 34, an internally threaded portion 36, and an adjacent large diameter main peripheral bearing surface 38. An annular groove 37 is provided to receive an annular elastomeric seal 39. Sockets 40 in the outer surface 42 of roller cutter 28 receive cutting inserts 44 therein which are secured by press fitting or other suitable securing method. For securing roller cutter 28 onto journal 20 for rotation, a thrust bearing ring generally indicated at 45 and externally threaded at 46 is received within groove 24 on journal 20 and is threaded onto internally threaded portion 36 of roller cutter 28. Thrust bearing ring 45 is preferably formed of two halves semicircular in shape which fit between shoulders 27 with a clearance between 0.005 inch and 0.010 inch. A notch 49 in one of the semicircular halves receives a tool 48 to prevent ring 45 from rotating, and roller cutter 28 is then threaded thereon. The mating threads are right hand threads so that they will not loosen as roller cutter 28 rotates during the drilling operation.

Figure 5:
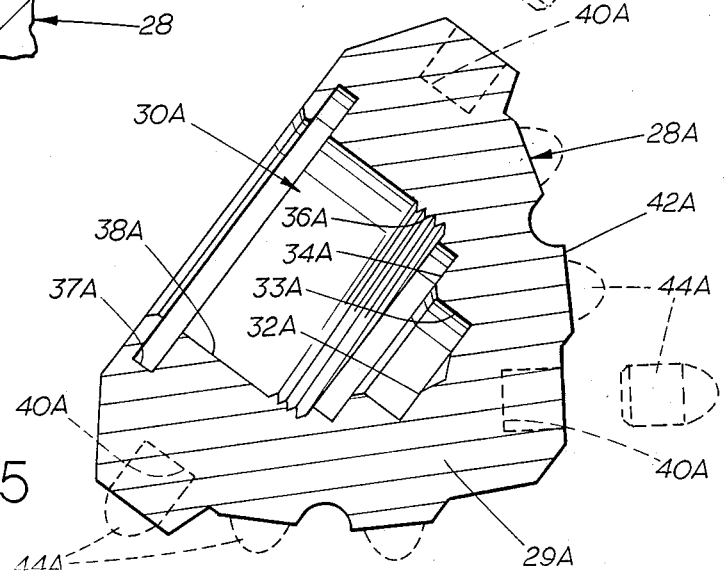
FIG. 5 is a section view of a roller cutter body or blank prior to heat treatment and the application of the ion nitriding process for hardening the exposed surfaces.

The roller cutter body or blank 29A from which roller cutter 28 is formed is shown in FIG. 5 and is heat treated prior to the application of the ion nitriding process by heating roller cutter body 29A. Roller cutter body 29A is formed of a medium to high carbon steel which has a carbon content between 0.35 per cent and 0.75 per cent, which is sufficient to provide a minimal yield strength of around 150,000 psi for roller cutter 28 after completion of the manufacturing process, including the ion nitriding.

Examples of suitable steels are AISI 4140 or 4340 which are medium carbon steels. It has also been found that certain marage steels are suitable for obtaining the desired yield strength and can be ion nitrided for obtaining case hardening. Such marage steels are through-hardenable to Rockwell values of 43RC to 52RC. A suitable approximate composition for a maraging steel by weight percent and designated under the trademark Vasco Max T-200 by Teledyne Vasco, Latrobe, Penna. is:

Ni 18.5%
Si 0.10% max
Mo 3.0%
Mn 0.10% max
Ti 0.70%
C 0.03% max
Al 0.10%
S 0.01% max
P 0.10% max Similar portions or elements of roller cutter 28 and body 29 are illustrated on roller cutter blank 29A with similar reference characters but including the designation "A". Roller cutter unfinished body or blank 29A as shown in FIG. 5 which uses medium to high carbon steel is first heated to a temperature of around 1550° F. for a period of around two (2) hours, and then quenched from 1550° F. to oil bath temperature at 140° F. to 180° F. Next, tempering is provided at around 900° F. for a period of about 1 to 2 hours. In the event a maraging steel is used for blank 29A, a different process is utilized comprising solution annealing at 1500° F. for two hours, then age hardening at 900° F. for three hours.

After heat treating, sockets 40A are formed in body 29A and cutting inserts or elements 44A are press fitted within sockets 40A. Then, the internal bearing surfaces 33A, 34A, and 38A defined by inner cavity 30A are finished to desired dimensions by grinding or machining to a surface finish having a roughness preferably around ten (10) to fifteen (15) microinches RMS and less than around thirty (30) microinches RMS. As it may not be desirable to case harden threaded surface 36 and the surfaces defining groove 37, these areas may be suitably masked to prevent the application of the ion nitriding process, if desired.

Figure 6:
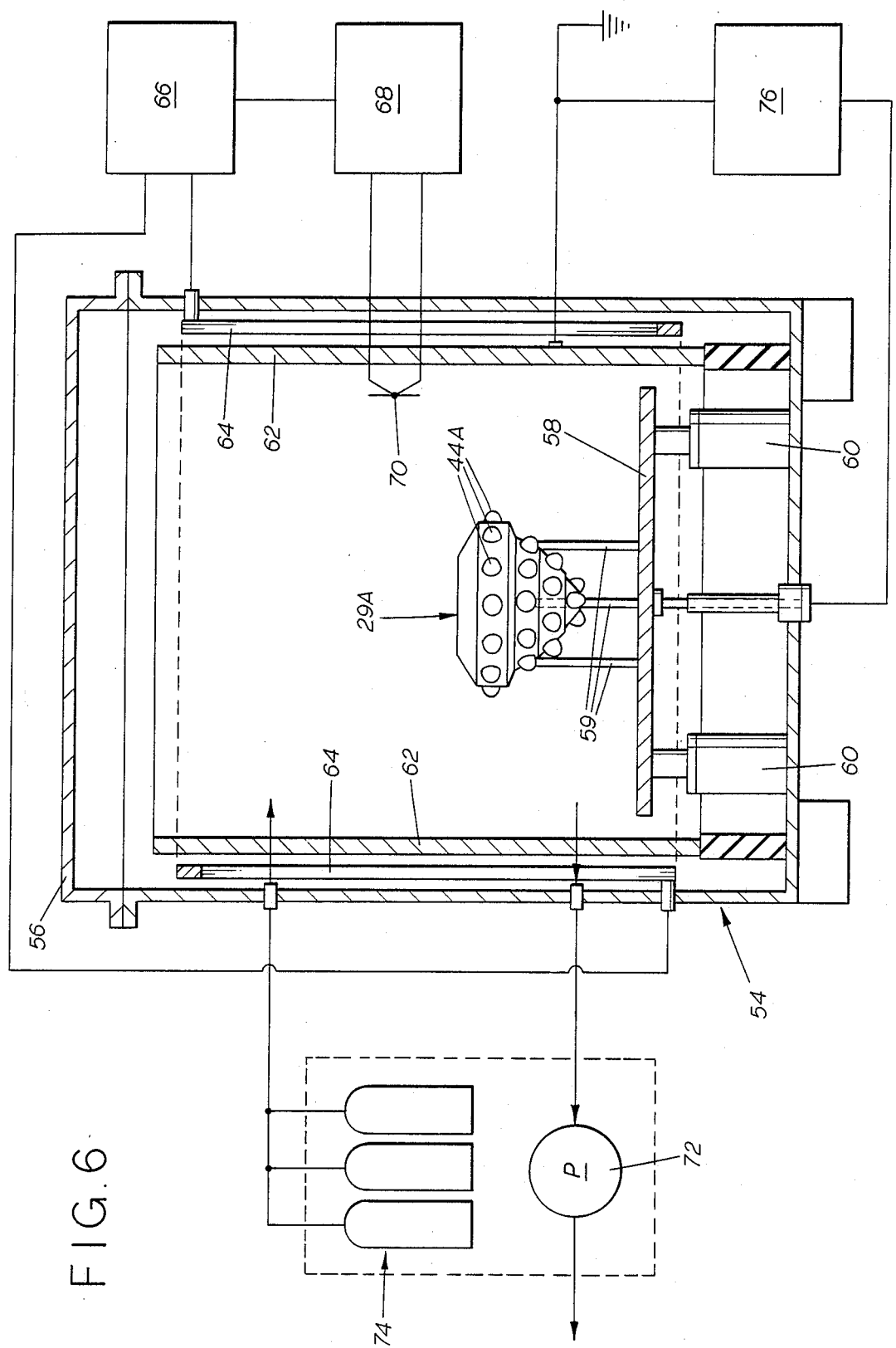
FIG. 6 is a diagrammatical view of an ion nitriding apparatus for carrying out the process for hardening the exposed surfaces of the roller cutter.

After heat treatment and insertion of cutting elements 44A as indicated above, roller cutter body 29A is positioned within an enclosed vessel or container shown generally at 54 in FIG. 6 for the application of the ion nitriding process. Vessel 54 is a acuum nitriding reactor formed of steel and having an upper closure for putting in and taking out roller cutter body 29A. A table or stand 58 has spaced rods 59 projecting upwardly for supporting roller cutter body 29A within container 54 and is supported by electrically insulated base members 60. A heat shielding plate 62 is provided between roller cutter body 29A and a heating element 64. Heating element 64 is connected to a DC power source 66 whose power is controlled by temperature controlling device 68 equipped with a temperature sensing thermocouple 70. The temperature in vessel 54 is sensed by thermocouple 70 and power source 66 is controlled by temperature controlling device 68 in accordance with the temperature sensed by thermocouple 70. Body 29A is heated to a temperature at which it can be ion nitrided preferably at a temperature around 900° F. and of a range between around 750° F. and 1150° F.

A vacuum pump 72 is connected to vessel 54 for evacuating vessel 54 to a low pressure of one (1) to ten (10) Torr. A gas supply device 74 supplies a gas mixture of nitrogen and hydrogen into enclosed vessel 54 of desired ratio between nitrogen and hydrogen. A ratio of one part nitrogen to three parts hydrogen has been found to be optimum. It is believed that a nitrogen content between 15% and 30% would function satisfactorily with the balance being hydrogen gas. A glow discharge power source 76 is connected in such a manner that heat shield or plate 62 acts as an anode and roller cutter body 29A acts as the cathode with a DC voltage applied between the two electrodes of around 700V to produce a glow discharge for a controlled period of time such as fifteen (15) hours. A DC voltage range between 500V and 1000V has been found to provide satisfactory results and causes the nitrogen to ionize and glow about the roller cutter body 29A.

As an example of the application of the ion nitriding process of the present invention with the apparatus as shown in FIG. 6, vessel 54 is evacuated by vacuum pump 72 to a low pressure of five (5) Torr, and charged with a nitrogen and hydrogen gas mixture at a ratio of 1 to 3. Under the reducing atmosphere in vessel 54, power source 66 is energized with heat shield plate 62 radiating heat for heating cutter body 29A to a temperature of 900° F. which is maintained during the entire nitriding process. Power source 76 is then energized so that a DC voltage of 700V is applied between plate 62 as the anode and roller cutter body 29A as the cathode to provide a glow discharge. With the combination of the glow discharge and heat radiated from heating element 64, roller cutter body 29A is maintained at the temperature of around 900° F. at which roller cutter body 29A is ready to be nitrided. While the nitriding process may be carried out with cutter body 29A at a higher temperature such as around 1150° OF., for example, roller cutter body 29A should maintain a temperature at least as high as around 750° F. during the application of the ion nitriding process.

Heated roller cutter body 29A is ion nitrided by means of the glow discharge in the atmosphere of the nitrogen and hydrogen gas mixture supplied by gas supplying device 74 with nitrogen comprising around 25 per cent by volume and hydrogen comprising around 75 per cent by volume. The ion nitriding process is applied for around 15 hours at the temperature of 900° F. in order to provide the desired thickness of the hardness layer of around 0.010 inch at a hardness of 50RC. Then, the roller cutter body is allowed to cool to an ambient temperature. Roller cutter 28 requires no further finishing and ion nitrided layer 77 has a surface hardness of between RC57 and RC63 while maintaining the smooth finish of between 10 and 15 microinches RMS as previously ground.

Figure 4:
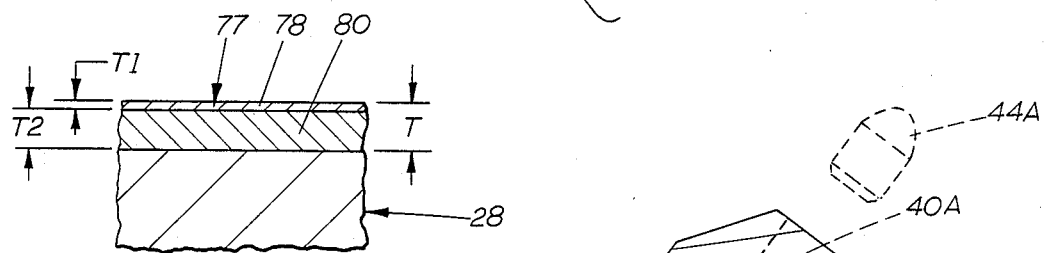
FIG. 4 is an enlarged section of the hardened layer on the surfaces formed by the ion nitriding process of the present invention taken generally along line 4—4 of FIG. 3.

Since roller cutter body 29A forms a cathode, nitrogen ions bombard, penetrate and harden outer surface 42A and the exposed bearing surfaces 33A, 34A, and 38A within the inner core or cavity 30A of roller cutter 29A to form the hardened case layer shown generally at 77 in FIG. 4 with a total thickness T. Hardened layer 77 comprises two separate stratums with the outer thin surface stratum 78 formed of a compound gamma prime phase of $Fe_4N$ of a thickness T1 between 0.0001 inch and 0.0004 inch and inner stratum 80 formed of a segregation free, diffusion stratum and of a thickness T2 between 0.005 inch and 0.030 inch of minimum hardness 50 RC. The mixture of nitrogen hydrogen gas is of a ratio of 25% nitrogen and 75% hydrogen for forming outer stratum 78 of $Fe_4N$ which is the gamma prime phase of the ion nitriding process and provides an outer so-called white layer. Total thickness T is of an optimum around 0.015 inch but may range from around 0.005 inch to around 0.030 inch for providing satisfactory and economical results. It is noted that the ion nitrided layer 77 is applied simultaneously to the external surface 42A of the roller cutter body 29 to provide a case hardened layer of the same thickness as on internal bore 30. It may be desirable under certain conditions to apply the ion nitrided layer only to the internal surfaces defining internal bore 30 and in this event, the external surfaces of the cutter body 29 may be suitably masked.

The case hardening of external surface 42A reduces the erosion of the external cutter surfaces by abrasive drilling fluids and formation interaction during the drilling process. To provide an increased depth or thickness of case hardening of the external surface 42A, the ion-nitrided process may be applied in a separate operation to external surface 42A by increasing the exposure time and/or the power density.

For example, to increase the depth or thickness of the case hardened layer 77 for external surface 42A from 0.015 inch to 0.025 inch the exposure time for the ion nitriding process may be increased from 15 hours to 35 hours. It is noted that sintered tungsten carbide inserts 44A are mounted in sockets 40A prior to the application of the ion nitriding process. If inserts 44A are mounted in sockets 40A after the application of the ion-nitriding process, cracking of the cutter surfaces adjacent sockets 40A may occur from the interference fit of inserts 44A within sockets 40A.

It has been found unexpectedly from metallurgical examination and surface indentation toughness testing that sintered tungsten carbide inserts incurred no adverse effects from the ion nitriding process, and further, no chemical reaction was detected at the exposed surfaces of the inserts from the ion nitriding process.

Such a formation of a hardened bearing surface provides a nonporous but ductile bearing surface having a low friction coefficient and without any further finishing or grinding being required. It is noted that journal 20 has its bearing surfaces 22, 23, and 26 formed of carburized steel and thus, does not require any special surfaces in order to provide an adequate bearing surface for roller cutter 28 having its bearing surfaces formed by the ion nitriding process.

A friction coefficient of 0.004 has been achieved by the present invention and it is believed that a friction coefficient as high as around 0.02 may achieve satisfactory results without the requirement of any special bearing surfaces on journal 20 or roller cutter bore 30. Such a thin hardened layer 77 of a total thickness less than around 0.030 inch has been found to function effectively while providing a low coefficient of friction, such as less than 0.010 for minimizing the quality of the adjacent bearing surfaces of the associated journal on which roller cutter 28 is mounted for rotation. The grinding or finishing of the bearing surfaces for roller cutter 28 are all completed prior to the ion nitriding process being applied and the ion nitriding process maintains the finish having a roughness less than 30 microinches RMS but preferably around 10 to 15 microinches RMS.

The following table is provided from testing of various bearing surfaces for a roller cutter and compares typical friction bearing surfaces of the roller cutter and cooperating journal relative to the friction coefficient and wear obtained. Five different pairs of associated bearing surfaces between the roller cutter and journal are indicated at A–E as set forth below and the friction coefficient is shown for each of the cooperating bearing surfaces A-E. The testing was performed by using a standard Falex Ring and Block Testing Machine, Model No. 1.

TABLE I

| Bearing Material Pair | Friction Coefficient | Wear Volume Loss (mm$^3$) | Temperature (Degrees F.) |
|---|---|---|---|
| A | 0.02 | .3 | 300 |
| B | 0.004 | .1 | 115 |
| C | 0.03 | 1.0 | 335 |
| D | 0.10 | 5.0 | 380 |
| E | 0.04 | 3.0 | 340 |

Pair A: Ag plated BeCu cutter v. carburized steel journal
Pair B: Ion-nitrided steel cutter v. carburized steel journal
Pair C: Ion-nitrided steel cutter v. stellite journal inlay
Pair D: Case hardened carburized steel cutter v. carburized steel journal
Pair E: Case hardened carburized steel cutter v. stellite journal inlay.

It is noted that bearing loads for roller cutters in drill bit application are high with typical "PV" and "P" ranges as set forth below for the main bearing surface on a roller cutter in a drill bit:

$$PV = \frac{200,000 - 1,500,000 \text{ (ft.)(lb.)}}{\text{(in)}^2\text{(min.)}}$$

and $$P = \frac{2,000 - 10,000 \text{ (lb.)}}{\text{(in)}^2}$$

The above tests were run for 36,000 cycles at a PV value of 460,000 ft. lbs/(in)$^2$(minutes) with P at 3200(lbs.)/(in)$^2$.

A typical friction bearing journal for rock bits may be case hardened carburized steel or a stellite inlay on steel. Pair A is representative of a successful combination of materials presently being used on the main friction bearing of rock bits. Pair B is representative of an ion nitrided rolling cutter bore against a carburized journal in accordance with the present invention. The friction and wear coefficients are much lower than the combination of materials as shown in Pair A. Pair C is representative of an ion nitrided roller cutter bore against a stellite inlayed journal in accordance with the present invention. It is noted that the coefficient of friction is substantially higher in Pair C than in Pair B. Thus, it is not necessary to apply stellite to the journal when ion nitriding the bore of the roller cutter.

Pair D is representative of a plain case hardened carburized bore running against a carburized journal. In this case, the friction and wear coefficients are very high. Pair E is the same as Pair D except that stellite has been applied to the surface of the journal. The addition of stellite to the journal as illustrated in Pair E tends to lower the friction and wear coefficients but field testing has shown that this combination is not particularly desirable successful when used on the main friction bearing of the journal since galling wear was observed when this combination of materials was field tested.

It is apparent that Pair B which utilized the present invention of the ion nitrided bore against a carburized journal substantially reduces the coefficient of friction from 0.02 to 0.004 as compared to bearing surfaces presently being employed. Such a reduction of the coefficient of friction particularly at the high PV loads run on rock bit bearings was unexpected.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention a set forth in the following claims.

What is claimed is:

1. A method of making a generally conical-shaped roller cutter for a rotary drill bit from a through hardening steel comprising the steps of:
    forming a roller cutter body from the through hardening steel, the body including a generally conical external surface and a central cavity forming internal friction bearing surfaces for fitting against a journal of the drill bit;
    heat treating said roller cutter body to obtain a yield strength of at least around 150,000 psi;
    placing the roller cutter body in a low pressure vessel containing a mixture of nitrogen and hydrogen gases;
    heating the roller cutter body in a low pressure vessel containing a mixture of nitrogen and hydrogen gases;
    heating the roller cutter body in the vessel to a temperature of at least around 750° F.;
    applying high voltage DC power between the vessel and the roller cutter body with the vessel acting as an anode and the roller cutter body acting as a cathode to provide a glow discharge to effect ionizing of nitrogen and the sputtering of nitrogen ions against friction bearing surfaces defined within the central cavity of the roller cutter body thereby to penetrate and harden said internal friction bearing surfaces; and
    maintaining said roller cutter body in said vessel at said temperature for a predetermined period of time sufficient to provide an ion nitrided hardened layer for said friction bearing surfaces of at least around 0.005 inch in thickness with a minimum hardness of at least RC50, said yield strength of said roller cutter body being maintained at a minimum of around 150,000 psi after providing said ion nitrided hardened layer.

2. The method as set forth in claim 1 including the steps of:
    maintaining the mixture of nitrogen and hydrogen gases at a ratio of 15-30% nitrogen gas with the remainder being hydrogen for providing an outer surface stratum of said hardened surface layer of Fe$_4$N of a thickness of between around 0.0001 inch and 0.0004 inch.

3. The method as set forth in claim 1 further including the steps of:
    forming a plurality of sockets on the external surface of said roller cutter body prior to the application of the ion nitrided hardened layer;
    placing tungsten carbide cutting inserts within the sockets prior to the application of the ion nitrided layer; and
    applying said ion nitrided hardened layer against said generally conical external surface including said cutting inserts.

4. The method as set forth in claim 3 wherein the application of said ion nitrided layer against said external surface is simultaneous with the application of said ion nitrided layer against said internal friction bearing surfaces.

5. The method as set forth in claim 3 wherein the application of said ion nitrided layer against said external surface is provided in a separate operation from the application of said ion nitrided layer against said internal friction bearing surfaces.

6. A method of making a generally conical-shaped roller cutter for a rotary drill bit from a through hardenable steel comprising the steps of:
   forming a roller cutter body from the through hardenable steel, the body including a generally conical external surface and a central cavity forming internal friction bearing surfaces for fitting against a journal of the drill bit;
   heat treating said roller cutter body to obtain a minimum yield strength of at least 150,000 psi;
   providing a predetermined number of sockets in said roller cutter body;
   securing a plurality of abrasion-resistant cutting elements within said sockets;
   finishing said friction bearing surfaces to a roughness not exceeding around thirty (30) microinches RMS;
   placing the roller cutter body in a low pressure vessel containing a mixture of nitrogen and hydrogen gases for the application of an ion nitrided layer on said internal bearing surfaces;
   heating the roller cutter body in the vessel to a temperature to at least around 750° F;
   applying high voltage DC power between the vessel and the roller cutter body with the vessel acting as an anode and the roller cutter body acting as a cathode to provide a glow discharge to effect ionizing of nitrogen and the sputtering of nitrogen ions against said generally conical external surface and said internal bearing surfaces defined within the central cavity of the roller cutter body thereby to penetrate and harden said surfaces; and
   maintaining said roller cutter body in said vessel at said temperature for a predetermined period of time sufficient to provide a nitrided hardened layer on said internal and external surfaces of at least around 0.005 inch in thickness with a minimum hardness of at least RC50, said yield strength of said roller cutter body being maintained at a minimum of 150,000 psi after providing said ion nitrided hardened layer, said nitriding hardened layer comprising an inner relatively thick stratum and an outer relatively thin surface stratum, said outer thin stratum being formed of $Fe_4N$ and of a thickness between around 0.0001 inch and 0.0004 inch.

7. The method as set forth in claim 6 including the step of:
   maintaining the mixture of nitrogen and hydrogen gases at a ratio of 15–30% nitrogen gas with the remainder being hydrogen gas during the entire application of the ion nitrided layer.

8. The method as set forth in claim 6 further including the steps of:
   evacuating the vessel to obtain a low pressure of between one (1) and ten (10) Torr within the vessel.

9. A method of making a generally conical-shaped roller cutter for threading onto an externally threaded ring on the journal of a rotary drill bit for securement of the cutter thereon for rotation comprising the steps of:
   forming a roller cutter body from a through hardenable steel body including a generally conical external surface and a central cavity forming internal friction bearing surfaces for fitting against a journal of the drill bit and including a threaded portion for securement of the cutter onto said threaded ring;
   heat treating said roller cutter body to obtain a minimum yield strength of at least 150,000 psi;
   providing a predetermined number of sockets in said roller cutter body;
   securing a plurality of abrasion-resistant cutting elements within said sockets;
   finishing said friction bearing surfaces to a roughness not exceeding around thirty (30) microinches RMS;
   placing the roller cutter body in a low pressure vessel containing a mixture of nitrogen and hydrogen gases for the application of an ion nitrided layer on said internal bearing surfaces;
   heating the roller cutter body in the vessel to a temperature of at least around 750° F.;
   applying high voltage DC power between the vessel and the roller cutter body with the vessel acting as an anode and the roller cutter body acting as a cathode to provide a glow discharge to effect ionizing of nitrogen and the sputtering of nitrogen ions against said internal bearing surfaces defined within the central cavity of the roller cutter body thereby to penetrate and harden said bearing surfaces; and
   maintaining said roller cutter body in said vessel at said temperature for a predetermined period of time sufficient to provide an ion nitrided hardened layer of at least around 0.005 inch in thickness with a minimum hardness of at least RC50, said yield strength of said roller cutter body being maintained at a minimum of 150,000 psi after providing said ion nitrided layer; said ion nitrided hardened layer comprising an inner relatively thick stratum and an outer relatively thin surface stratum, said outer thin stratum being formed of $Fe_4N$ and of a thickness between around 0.0001 inch and 0.0004 inch.

* * * * *